(12) United States Patent
Kuo et al.

(10) Patent No.: US 6,911,493 B2
(45) Date of Patent: *Jun. 28, 2005

(54) ACRYLATE-FUNCTIONALIZED ALKYD COMPOSITIONS FOR FAST-DRY COATINGS

(75) Inventors: Thauming Kuo, Kingsport, TN (US); Paul Vincent Grosso, Algonquin, IL (US); Gary Eugene Spilman, Lake in the Hil, IL (US); Mark Dwight Clark, Kingsport, TN (US); Michael Davis Coad, St. Charles, IL (US); Mingbo He, Streamwood, IL (US)

(73) Assignee: Resolution Specialty Materials LLC, Houston, TX (US)

( * ) Notice: Subject to any disclaimer, the term of this patent is extended or adjusted under 35 U.S.C. 154(b) by 231 days.

This patent is subject to a terminal disclaimer.

(21) Appl. No.: 10/121,927

(22) Filed: Apr. 12, 2002

(65) Prior Publication Data

US 2003/0195294 A1 Oct. 16, 2003

(51) Int. Cl.$^7$ ................................................. C08K 3/10
(52) U.S. Cl. ....................... 524/413; 524/433; 524/455; 428/458; 428/522
(58) Field of Search ................................ 524/413, 433, 524/455; 428/458, 522

(56) References Cited

U.S. PATENT DOCUMENTS

| | | | |
|---|---|---|---|
| 3,196,119 A | 7/1965 | Boller et al. | |
| 3,641,201 A | 2/1972 | Hellman | |
| 3,734,874 A | 5/1973 | Kibler et al. | |
| 3,932,562 A | 1/1976 | Takahashi | |
| 4,016,332 A | 4/1977 | Anderson et al. | |
| 4,102,944 A | 7/1978 | Fukuyama et al. | |
| 4,113,702 A | 9/1978 | Psencik | |
| 4,116,903 A | 9/1978 | Lietz et al. | |
| 4,131,579 A | 12/1978 | Mummenthey et al. | |
| 4,234,466 A | 11/1980 | Takahashi et al. | |
| 4,474,941 A | 10/1984 | Wilk et al. | |
| 4,517,322 A | 5/1985 | Birkmeyer et al. | |
| 4,571,420 A | 2/1986 | Marks | |
| 4,690,980 A | 9/1987 | Singer et al. | |
| 4,719,254 A | 1/1988 | Levine | |
| 4,973,656 A | 11/1990 | Blount | |
| 4,983,716 A | 1/1991 | Rao et al. | |
| 5,218,042 A | 6/1993 | Kuo et al. | |
| 5,288,804 A | 2/1994 | Kim et al. | |
| 5,340,871 A | 8/1994 | Pearson et al. | |
| 5,348,992 A | 9/1994 | Pearson et al. | |
| 5,349,026 A | 9/1994 | Emmons et al. | |
| 5,371,148 A | 12/1994 | Taylor et al. | |
| 5,378,757 A | 1/1995 | Blount, Jr. et al. | |
| 5,484,849 A | 1/1996 | Bors et al. | |
| 5,498,659 A | 3/1996 | Esser | |
| 5,530,059 A | 6/1996 | Blount, Jr. et al. | |
| 5,859,135 A | 1/1999 | Doomen et al. | |
| 6,051,633 A | 4/2000 | Tomko et al. | |
| 6,242,528 B1 | 6/2001 | Clark et al. | |
| 6,262,149 B1 | 7/2001 | Clark et al. | |
| 6,323,254 B1 | 11/2001 | Weikard et al. | |
| 6,344,503 B1 | 2/2002 | Nkansah et al. | |
| 6,476,183 B2 | 11/2002 | Bakkeren et al. | |
| 6,534,598 B2 | 3/2003 | Kuo et al. | |
| 6,548,601 B1 | 4/2003 | Kuo et al. | |

FOREIGN PATENT DOCUMENTS

| | | |
|---|---|---|
| EP | 0 351 024 A2 | 1/1990 |
| EP | 1002842 A1 | 5/2000 |
| EP | 1 149 874 A | 10/2001 |
| JP | 48085628 | 11/1973 |
| WO | WO 99/07759 A1 | 2/1999 |
| WO | WO 00/73392 A3 | 12/2000 |
| WO | WO 01/00741 A1 | 1/2001 |

OTHER PUBLICATIONS

Oldring et al, Resins for Surface Coatings, 1987, vol. 1, p. 127.
Oldring et al, Resins for Surface Coatings, 1987, vol. 1, p. 181.
Calbo, Handbook of Coatings Additives, 1987, p. 496–506.
Witzeman, et al, Journal of Coatings Technology, 1990, vol. 62, No. 789, pp. 101–112.
U.S. Appl. No. 10/121,396, filed Apr. 12, 2002, Kuo et al.
U.S. Appl. No. 10/356,286, filed Jan. 31, 2003, He.
F. Del Rector et al., Journal of Coatings Technology, pp. 31–37, vol. 61, No. 771, Apr. 1989.

Primary Examiner—Kriellion A. Sanders

(57) ABSTRACT

A solvent-borne acrylate-functionalized alkyd coating composition is disclosed which includes an acrylate-functionalized alkyd, at least one drier, and an organic solvent. Also disclosed is a waterborne acrylate-functionalized alkyd coating composition including an acrylate-functionalized alkyd resin, at least one drier, and water. The acrylate-functionalized alkyd resin comprises the reaction product of (i) an alkyd resin having an acid number from greater than 0 to about 10 mg KOH/g, and (ii) a glycidyl acrylate. Also disclosed are methods of preparing acrylate-functionalized alkyd coating compositions, and coating compositions made by such methods.

28 Claims, No Drawings

ACRYLATE-FUNCTIONALIZED ALKYD COMPOSITIONS FOR FAST-DRY COATINGS

FIELD OF THE INVENTION

The invention relates to waterborne or organic solvent-borne coating compositions, and more particularly, to waterborne or organic solvent-borne coating compositions having acrylate-functionalized alkyd resins.

BACKGROUND OF THE INVENTION

In recent years, considerable efforts have been made by the coatings industry to develop coating formulations containing little or no volatile organic compound (VOC) content. Regulations to limit the VOC content of industrial coatings have encouraged research and development to explore new technologies directed at reducing solvent emissions from industrial solvent-based coatings operations for such products as automobiles, appliances, general metal products, furniture, and the like. However, while the move to reduced organic solvent-based compositions brings health and safety benefits, these lower VOC coating compositions must still meet or exceed the performance standards expected from solvent-based compositions.

Alkyd resins are one of the most common binders used for ambient-cure, solvent-based coatings. An alkyd is typically prepared by reacting a diol, a polyol, a polyacid, a monofunctional acid, and a fatty acid, fatty ester, or a naturally occurring, partially-saponified oil, optionally in the presence of a catalyst. More specifically, an alkyd resin can be the reaction product of: (i) from 0 to about 30 mol % of a diol, (ii) from about 10 to about 40 mol % of a polyol, (iii) from about 20 to about 40 mol % of a polyacid, (iv) from 0 to about 10 mol % of a monofunctional acid, (v) from about 10 to about 50 mol % of a fatty acid, fatty ester, or naturally occurring oil, and optionally, (vi) a catalyst, wherein the mole percents are based on the total moles of (i), (ii), (iii), (iv), (v), and (vi), if present. Suitable examples of each of the components of the alkyd resin include those known in the art, including, but not limited to, those discussed below, and in *Resins for Surface Coatings*, Vol. 1, p. 127, ed. by P. K. T. Oldring and G. Hayward, SITA Technology, London, UK, 1987, incorporated herein by reference.

The resistance properties of traditional solvent-borne alkyd resins are a result of autooxidative crosslinking of the alkyd film upon application to a substrate. Crosslinking occurs when the activated methylene groups in the unsaturated fatty acids or oils of the alkyd are oxidized in air to give hydroperoxides, which subsequently decompose to generate free radicals, leading to oxidative crosslinking. This oxidative crosslinking process is commonly accelerated by adding driers, such as, for example, the various salts of cobalt, zirconium, calcium, and manganese. However, while alkyd resins have shown, and continue to show, promise, they have relatively slow "dry" and/or cure times, particularly at ambient temperatures.

Conventional long oil alkyds are nonetheless used throughout the coatings industry as the main binder in high gloss architectural trim enamels. Typical alkyds are made from (i) soybean oil, reacted with pentaerythritol (PE) via alcoholysis, and then (ii) reacted in a second stage with phthalic anhydride (PAN). The result is a long oil alkyd with good through-dry (the PE allows an alkyd with high branching and number average molecular weight [Mn]), light color, yellowing resistance, and low cost. However, these conventional long oil alkyds require a large amount of organic solvent (>350 g/L VOC) for use in paint formulations. These resins typically have an acid number of from 2 to 10, a relatively low acid number which is desirable to ensure complete polycondensation to yield alkyd resins having reasonably high molecular weight. A relatively high molecular weight, in turn, leads to more acceptable drying times for the coatings.

High-solids alkyds have been developed for use in 250 g/L VOC, high gloss architectural trim enamels. Reduction in viscosity in these resins is achieved by lowering the amount of PE, which results in less branching and a lower Mn. One such alkyd is Duramac HS 5816, available from Eastman Chemical Company, which is made from (i) sunflower oil reacted with pentaerythritol (PE) via alcoholysis, followed by (ii) a fatty acid, and (iii) phthalic anhydride. The result is a long oil alkyd having a reasonable through-dry and a light color at a reasonable cost, but with reduced yellowing resistance.

There is, then, a trade-off between through-dry and yellowing. Less yellowing is observed with the use of less conjugated fatty acids and oils, but with the disadvantage that the through-dry properties are adversely affected. An additional drawback with high-solids alkyds is that typical high-solids alkyds result in paints that exhibit stringiness or ropiness (brush drag and high ICI viscosity).

Various modifications have been made to alkyd resins in an attempt to address these concerns. One such attempt involves polymerization of an alkyd resin with a vinyl compound, such as styrene or methyl methacrylate, via a free-radical reaction, to produce a vinyl-alkyd copolymer or a vinyl alkyd. Vinyl alkyd resins generally have a higher molecular weight and a higher $T_g$, producing coatings with reduced tack-free time (solvent evaporation). However, the through-dry time (oxidation of the film) of such coatings is longer due to the decreased degree of unsaturation in the alkyd resulting from the copolymerization with the vinyl compound. This problem is described in further detail in *Resins for Surface Coatings*, Vol. 1, p. 181, ed. by P. K. T. Oldring and G. Hayward, SITA Technology, London, UK, 1987, which is incorporated herein by reference. An additional drawback with vinyl alkyd resins is that paint formulations containing vinyl alkyd resins require a higher content of organic solvent, due to the increased molecular weight and $T_g$ of the vinyl alkyd.

JP 48085628 (hereinafter JP '628) describes light-curable coating compositions made from a drying oil-modified alkyd resin which is further modified using glycidyl acrylate, glycidyl methacrylate, or its derivative. In this reference, drying oil-modified alkyd resins having —$CO_2H$ groups and an oil length of 20–80 are treated with glycidyl acrylate, glycidyl methacrylate, or its derivative, in the presence of a polymerization inhibitor. In a specific embodiment, a drying oil-modified alkyd resin having an acid number of 100 and an oil length of 34 is reacted with 36 parts glycidyl methacrylate, to give a resin varnish having an acid number of 5.0.

Both the acid number of the drying oil-modified alkyd resin of JP '628, and the amount of glycidyl methacrylate used, are relatively high, requiring the use in the reaction mixture of hydroquinone, a polymerization inhibitor, to prevent the alkyd from gelling during resin synthesis. One drawback of this approach is that the presence of a polymerization inhibitor in paint formulations is known to prolong the drying times of the resulting coating films. Moreover, the disclosed alkyd resin composition of JP '628 contains an amine monomer, triethanolamine, which is desirable for the UV cure application intended, but can cause detrimental effects on oxidative cure. The resin in JP '628 is afterward mixed with a photosensitizer or a photoinitiator to give a coating composition which hardens with UV irradiation. Accordingly, the disclosed coating composition requires the use of a photosensitizer or photoinitiator, and UV irradiation, in order to carry out the teaching. The reference does not teach a coating composition suitable for ambient oxidative cure, high-solids coating applications.

PCT Publ. No. WO 01/00741 A1 discloses an ambient oxidative cure composition based on an acrylate-functionalized alkyd resin. The acrylate-functionalized resin is prepared by reacting a hydroxyl-functional alkyd resin, for example with an acid number of from 0 to about 10 mg KOH/g, with about 2–8 mole % of an acid anhydride, such as trimellitic anhydride, to produce a carboxyl-functional alkyd resin. The carboxyl-functional alkyd resin is thereafter reacted with a glycidyl acrylate, to produce an acrylate-functionalized alkyd resin having an acid number of less than about 5. A disadvantage of the process described is that the resin is first carboxylated with an acid anhydride, such as trimellitic anhydride, to increase the acid number, prior to functionalizing the resin with a glycidyl acrylate. It would be advantageous to dispense with this carboxylation step, and to directly react the alkyd with the glycidyl acrylate, while still obtaining a coating which exhibits an acceptable dry time.

SUMMARY OF THE INVENTION

It has been unexpectedly discovered that the pre-reaction of an alkyd resin with an acid anhydride is not necessary, prior to further modification with a glycidyl acrylate, and that an alkyd resin having an acid number less than about 10 can be directly reacted with a glycidyl acrylate, and a coating having acceptable cure properties obtained. The prior art neither discloses nor fairly suggests that an alkyd with a low acid number (e.g., <about 10) has sufficient carboxyl functionality to react with a glycidyl acrylate, and to thereafter provide significant improvement in coating dry time. The present invention thus eliminates the need for pre-reacting the alkyd resin with an acid anhydride. Further, it reduces the amount of the higher cost raw material, glycidyl methacrylate, used in the alkyd composition. As a result, this invention provides a method for the preparation of lower-cost, acrylate-modified alkyds.

The present invention thus provides an acrylate-functionalized alkyd coating composition comprising the alkyd resin according to the invention, at least one drier, and an organic solvent. In another embodiment, the invention provides an acrylate-functionalized alkyd coating composition comprising the acrylate-functionalized alkyd resin according to the invention, at least one drier, and water. The acrylate-functionalized alkyd resin of the present invention comprises the reaction product of (a) an alkyd resin, and (b) a glycidyl acrylate, in the absence of a pre-reaction step in which an acid anhydride is reacted with the alkyd resin. The glycidyl moiety of the glycidyl acrylate is the reactive moiety for the purpose of functionalizing the alkyd resin, the resulting product containing pendant reactive acrylate moieties.

The invention also provides a method of preparing an acrylate-functionalized alkyd coating composition comprising a step of contacting the acrylate-functionalized alkyd resin according to the invention with at least one drier in the presence of an organic solvent.

In another embodiment, the invention provides a method of preparing an acrylate-functionalized alkyd coating composition comprising the step of contacting the acrylate-functionalized alkyd resin according to the invention with at least one drier in the presence of water.

DETAILED DESCRIPTION OF THE INVENTION

The invention provides an acrylate-functionalized alkyd resin that comprises the reaction product of an alkyd resin, having an acid number from greater than 0 to about 10 mg KOH/g, with a glycidyl acrylate, wherein the reaction product contains reactive acrylate moieties. In another aspect, the alkyd resin is not reacted with an acid or an acid anhydride prior to reacting with the glycidyl acrylate. In a further aspect, the acid number of the alkyd resin is from about 2 to about 9 mg KOH/g, or from about 3 to about 9 mg KOH/g, or from about 3 to about 7 mg KOH/g, or from about 4 to about 7 mg KOH/g.

In yet another aspect of the invention, the alkyd resin comprises the reaction product of (i) a diol, in an amount of from 0 to about 30 mol %; (ii) a polyol, present in an amount of from about 10 to about 40 mol %; (iii) a polyacid, present in an amount of from about 20 to about 40 mol %; (iv) a monofunctional acid, in an amount of from 0 to about 10 mol %; and (v) a fatty acid, a fatty ester, or a naturally occurring oil, present in an amount of from about 10 to about 50 mol %, wherein the mole percents are based on the total moles of (i), (ii), (iii), (iv), and (v).

In a specific embodiment of the invention, the glycidyl acrylate is glycidyl methacrylate. In another specific embodiment, the alkyd resin further comprises from about 2 to about 10 mol % of a sulfomonomer, for example 5-sodiosulfoisophthalic acid.

The invention thus provides an acrylate-functionalized alkyd coating composition comprising the acrylate-functionalized alkyd resin of the invention, at least one drier, and an organic solvent. In another embodiment, the invention provides an acrylate-functionalized alkyd coating composition comprising the acrylate-functionalized alkyd resin of the invention, at least one drier, and water. The acrylate-functionalized alkyd resin comprises the reaction product of (a) an alkyd resin, and (b) a glycidyl acrylate, in the absence of a pre-reaction step in which the alkyd resin is pre-reacted with an acid anhydride prior to being functionalized with a glycidyl acrylate. The glycidyl moiety of the glycidyl acrylate is the reactive moiety to functionalize the alkyd resin, the resulting product containing pendant reactive acrylate moieties available for subsequent crosslinking reactions.

Such compositions have been found to exhibit improved dry time properties suitable for fast-dry, ambient-cure coating applications. Unlike the acrylate-functionalized alkyd resin disclosed in PCT Publn. No. WO 01/00741, the acrylate functionalized alkyd resin of the present invention is prepared by direct modification of an alkyd with a glycidyl acrylate without pre-reacting with an acid anhydride, or otherwise carboxylating the alkd resin. The acid anhydride is used according to this document to increase the acid number (e.g., to >20 mg KOH/g) of the hydroxyl functional resin for further modification with a glycidyl acrylate. The document does not suggest that an alkyd with a low acid number (e.g., <about 10) has sufficient carboxyl groups to react with a glycidyl acrylate and to subsequently provide significant improvement in coating dry time. The present invention thus eliminates the need for pre-reacting with an acid anhydride. Further, it reduces the amount of the higher cost raw material, glycidyl methacrylate, used in the alkyd composition. As a result, this invention provides a method for the preparation of lower-cost, acrylate-modified alkyds.

In a preferred embodiment of the invention, an acrylate-functionalized alkyd coating composition contains about 50 to greater than 99 wt %, or from based on the total weight of the composition, of the acrylate-functionalized alkyd resin, about 1 to about 50 wt %, based on the total weight of the composition, of an organic solvent, and about 0.01–3.0 wt %, based on the total weight of the composition, of at least one drier. According to the invention, an acrylate-functionalized alkyd coating composition exhibits improved tack-free and through-dry times, and may be used in enamel compositions having reduced VOC and fast through-dry and tack-free times.

In another preferred embodiment of the invention, an acrylate-functionalized alkyd coating composition contains from about 30 to about 60 wt %, based on the total weight of the composition, of the acrylate-functionalized alkyd resin, from about 40 to about 70 wt %, based on the total weight of the composition, of water, from 0 to about 30 wt %, based on the total weight of the composition, of an organic solvent, and from about 0.01–3.0 wt %, based on the total weight of the composition, of at least one drier.

An acrylate-functionalized alkyd resin is an alkyd resin containing terminal reactive acrylate groups or moieties. An acrylate-functionalized alkyd resin is the reaction product of an alkyd resin and a glycidyl acrylate, of which the glycidyl moiety is the reactive moiety. In a preferred embodiment of the invention, the acrylate-functionalized alkyd resin comprises the reaction product of: (a) from about 95 to about 99 wt % of the alkyd resin, and (b) from about 1 to about 5 wt % of a glycidyl acrylate, each as described herein, wherein the weight percents are based on the total weight of (a) and (b). The acrylate-functionalized alkyd resin may also comprise the reaction product of: (a) from about 95 to greater than about 99 wt % of the alkyd resin, and (b) from less than about 1 to about 5 wt % of a glycidyl acrylate, each as described herein, wherein the weight percents are based on the total weight of (a) and (b). Similarly, the acrylate-functionalized alkyd resin may comprise the reaction product of: (a) from about 98 to greater than about 99 wt % of the alkyd resin, and (b) from about 1 to about 2 wt % of a glycidyl acrylate, each as described herein, wherein the weight percents are based on the total weight of (a) and (b).

Any alkyd resin may be used as an alkyd resin in a coating composition of the invention. An alkyd may thus be prepared by reacting a diol, a polyol, a polyacid, a monofunctional acid, and a fatty acid, fatty ester, or a naturally occurring, partially-saponified oil, optionally in the presence of a catalyst. Specifically, an alkyd resin can be the reaction product of: (i) from 0 to about 30 mol % of a diol, (ii) from about 10 to about 40 mol % of a polyol, (iii) from about 20 to about 40 mol % of a polyacid, (iv) from 0 to about 10 mol % of a monofunctional acid, (v) from about 10 to about 50 mol % of a fatty acid, fatty ester, or naturally occurring oil, and optionally, (vi) a catalyst, wherein the mole percents are based on the total moles of (i), (ii), (iii), (iv), (v), and (vi), if present. Suitable examples of each of the components of the alkyd resin include those known in the art, including, but not limited to, those discussed below, and in *Resins for Surface Coatings*, Vol. 1, p. 127, ed. by P. K. T. Oldring and G. Hayward, SITA Technology, London, UK, 1987, incorporated by reference herein.

The fatty acid, fatty ester, or naturally occurring, partially-saponified oil may be any fatty acid, fatty ester, or naturally occurring, partially-saponified oil known in the art used in the formation of an alkyd resin. In a preferred embodiment, at least one monobasic fatty acid, fatty ester, or naturally occurring, partially-saponified oil is used and selected from the following formulae (I), (II) and (III):

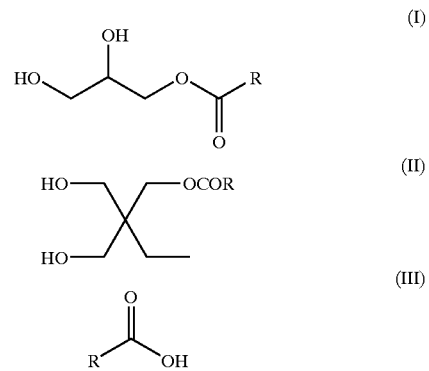

In formulae (I), (II) and (III), R is a saturated or unsaturated $C_8$–$C_{20}$ alkyl group. More preferably, R is one of the following unsaturated $C_{17}$ alkyl groups:

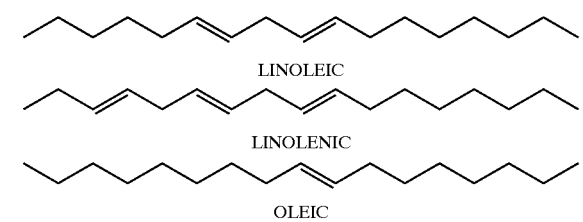

In another embodiment, the monobasic fatty acid or fatty ester oil may be prepared by reacting an oil or a fatty acid with a polyol. Examples of suitable oils include sunflower oil, canola oil, dehydrated castor oil, coconut oil, corn oil, cottonseed oil, fish oil, linseed oil, oiticica oil, soya oil, tung oil, animal grease, castor oil, lard, palm kernel oil, peanut oil, perilla oil, safflower oil, tallow oil, walnut oil, and the like. Suitable examples of fatty acids alone or as components of oil include, but are not limited to, tallow acid, soya acid, myristic acid, linseed acid, crotonic acid, versatic acid, coconut acid, tall oil fatty acid (e.g., PAMOLYN 200 and PAMOLYN 380, commercially available from Eastman Chemical Co.), rosin acid, neodecanoic acid, neopentanoic acid, isostearic acid, 12-hydroxystearic acid, cottonseed acid, and the like.

The polyol used in the preparation of the alkyd resin itself, or the monobasic fatty acid or fatty ester, is preferably selected from aliphatic, alicyclic and aryl alkyl polyols. Suitable examples of polyols include, but are not limited to, trimethylolpropane (TMP), pentaerythritol (PE), trimethylolethane, erythritol, threitol, dipentaerythritol, sorbitol, glycerine, and the like. Preferably, the polyol is trimethylolpropane (TMP) or pentaerythritol (PE).

In addition to the polyol, a diol may be used in the preparation of the alkyd resin. Examples of suitable diols include, but are not limited to, neopentyl glycol (NPG), ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, and hydrogenated bisphenol A. Preferably, the diol is neopentyl glycol (NPG).

The polyacid (dicarboxylic acid or tricarboxylic acid) and monofunctional acid (monocarboxylic acid) components of the alkyd resin may be any polyacid or monofunctional acid known in the art used in the formation of an alkyd resin. The dicarboxylic acid may be, for example, isophthalic acid, phthalic anhydride (acid), terephthalic acid, adipic acid, tetrachlorophthalic anhydride, dodecanedioic acid, sebacic acid, azelaic acid, 1,4-cyclohexanedicarboxylic acid, 1,3-cyclohexanedicarboxylic acid, hexahydrophthalic anhydride, tetrahydrophthalic anhydride, maleic anhydride, fumaric acid, succinic anhydride, succinic acid, 2,6-naphthalenedicarboxylic acid, glutaric acid, and the like. Preferably, the dicarboxylic acid is isophthalic acid, phthalic anhydride, or phthalic acid. The tricarboxylic acid may be, for example, trimellitic anhydride. A monofunctional acid may also be used, such as, for example, benzoic acid, acetic acid, propionic acid, t-butylbenzoic acid, and butanoic acid.

Optionally, a catalyst may be used to promote the formation of an alkyd resin. The catalyst may be any catalyst known in the art to be used in the formation of an alkyd resin. Preferably, the catalyst is an acid catalyst, such as, for example, FASCAT 4100. The amount of catalyst added promotes the formation of an alkyd resin as described above, and may be determined by routine experimentation as understood by those skilled in the art. Preferably, a catalyst is added in amounts ranging from about 0.01–1.00 wt %, based on the amounts of reactants.

An alkyd resin may be prepared at a temperature range of about 170–250° C. In a preferred embodiment of the invention, an alkyd resin has an acid number of from about 2 to about 9 mg KOH/g, or from about 3 to about 9 mg KOH/g, or from about 3 to about 7 mg KOH/g, or from about 4 to about 7 mg KOH/g. The alkyd resin has a preferred number average molecular weight of from about 700 to about 6500, more specifically from about 1000 to about 3500, and a $T_g$ of less than about 25° C.

In another embodiment of the invention, the alkyd resin further comprises 2 to 10 mol % of a sulfomonomer. The difunctional sulfomonomer is utilized to promote water dispersibility, and may be a diacid or derivative thereof, containing an —$SO_3M$ group. Suitable difunctional sulfomonomers are described in U.S. Pat. Nos. 4,973,656, 5,218,042, and 5,378,757. The metal ion of the sulfonate salt group may be $Na^+$, $Li^+$, $K^+$, $Mg^{2+}$, $Ca^{2+}$, $Cu^{2+}$, $Fe^{2+}$, or $Fe^{3+}$. Preferably, the metal ion is a monovalent cation.

The —$SO_3M$ group may be attached to an aromatic nucleus, examples of which include, but are not limited to, benzene, naphthalene, anthracene, diphenyl, oxydiphenyl, sulfonyldiphenyl, and methylenediphenyl. For example, the difunctional monomer may be a sodium salt of a sulfoterephthalic acid, 5-sulfoisophthalic acid, sulfophthalic acid, 4-sulfonaphthalene-2,7-dicarboxylic acid, dimethyl 5-sulfoisophthalic acid, or a derivative of such acids. Preferably, the difunctional sulfomonomer is 5-(sodiosulfo)-isophthalic acid, 5-(lithiosulfo)-isophthalic acid, or methyl esters of these. The most preferred difunctional sulfomonomer is 5-(sodiosulfo)-isophthalic acid (SIP).

The SIP-containing alkyd may be prepared by pre-reacting NPG and SIP, at a temperature range of about 150–190° C., followed by the reaction with other reactants. To enhance water dispersibility, another preferred embodiment of the coating composition further comprises an amine. The amine is added to neutralize the carboxyl groups in the acrylate-functionalized alkyd resin, to yield ammonium salts which are water dispersible. The amine is present in an amount sufficient to neutralize 70–100% of the carboxyl groups in the acrylate-functionalized alkyd resin. Typical amines include, but are not limited to, ammonia, trimethylamine, triethylamine, diethylamine, monoethanolamine, monoisopropanolamine, morpholine, ethanolamine, diethanolamine, N,N-dimethylethanolamine, N,N-diethylethanolamine, and N-methyldiethanolamine.

In another embodiment of the invention, the waterborne composition described above further comprises a surfactant. The surfactant is added to effect the successful emulsification of the alkyd resin in water. Suitable surfactants for alkyd emulsification may be anionic, cationic, or nonionic surfactants. Examples of anionic surfactants include alkali metal or ammonium salts of fatty acids; alkyl, aryl or alkylaryl sulfonates, sulfates or phosphates; and mixtures thereof. Examples of nonionic surfactants include alkyl and alkylarylpolydiol ethers such as ethoxylation products of lauryl, oleyl and stearyl alcohols, and alkylphenol glycol ethers such as ethoxylation products of octylphenol or nonylphenol.

An acrylate-functionalized alkyd resin may be prepared by reacting an alkyd resin with a glycidyl acrylate to produce an acrylate-functionalized alkyd resin, as described herein. An acrylate-functionalized alkyd resin may be prepared at a temperature range of from about 100–170° C., more preferably from about 115–165° C., and most preferably, from about 125–155° C.

In another embodiment of the invention, an acrylate-functionalized alkyd resin is prepared by reacting: (i) from 0 to about 30 mol % of a diol, (ii) from about 10 to about 40 mol % of a polyol, (iii) from about 20 to about 40 mol % of a polyacid, (iv) from 0 to about 10 mol % of a monofunctional acid, and (v) from about 10 to about 50 mol % of a fatty acid, fatty ester, or naturally occurring, partially-saponified oil, in the presence of (vi) a catalyst, each as described above, at about 180–250° C., until the desired amount of the condensate is obtained to form (a) an alkyd resin, wherein the mole percents are based on the total moles of (i), (ii), (iii), (iv), (v) and (vi); reacting the alkyd resin (a) with from about 2 to about 15 wt % of (b) glycidyl acrylate at about 125–155° C., until an acid number of less than about 5 is obtained, to thereby form the desired acrylate-functionalized alkyd resin, each as described above, wherein the weight percent is based on the total weight of (a) and (b).

The glycidyl acrylate may be any substituted or unsubstituted acrylate containing an epoxide or glycidyl moiety, that upon reaction with an alkyd resin will produce an acrylate-functionalized alkyd resin capable of effecting crosslinking during the curing process, each as described above. According to the invention, upon reaction with an alkyd resin, the glycidyl moiety of the glycidyl acrylate exhibits greater reactivity than the acrylate moiety (i.e. it is the glycidyl moiety which undergoes reaction with the alkyd resin). Suitable substituents for the acrylate portion of the glycidyl acrylate include $C_1$–$C_{18}$ alkyl groups to form classes of compounds, such as, for example, alkylacrylates (e.g., methacrylates) and crotonates. Preferably, the glycidyl acrylate is glycidyl methacrylate.

The drier of an ambient cure composition of the invention may be any drier known in the art. Examples of suitable driers include, but are not limited to, various salts of cobalt, zirconium, calcium, zinc, lead, iron, cerium, aluminium, and manganese. Preferably, the drier is a cobalt drier. Mixtures of driers (i.e. a drier system) may also be used. The driers typically are used as octoates or naphthenates, in an amount of from 0.005–0.5 wt. % metal, based on the alkyd resin. Examples of commercial products are Zirconium HEX-CEM, Cobalt TEN-CEM, Calcium CEM-ALL, Zirconium HYDRO-CEM, and Cobalt HYDRO-CURE II sold by OMG Americas of Westlake, Ohio. A description of metal driers, their functions, and methods for using them may be found in *Handbook of Coatings Additives*, p. 496–506, ed. by L. J. Calbo, Marcel Dekker, INC. New York, N.Y., 1987, incorporated by reference herein in its entirety.

In a preferred embodiment of the invention, an acrylate-functionalized alkyd coating composition, as described above, may also contain at least one pigment, to form an acrylate-functionalized alkyd coating enamel composition. Preferably, the pigment is present in an amount of about 30 to about 60 wt % based on the total weight of the composition. Examples of suitable pigments include those recognized by those of ordinary skill in the art of surface coatings. For example, the pigment may be a typical organic or inorganic pigment, especially those set forth by the Colour Index, 3d Ed., 2d Rev., 1982, published by the Society of Dyers and Colourists in association with the American Association of Textile Chemists and Colorists, which document is incorporated herein by reference. Other examples of suitable pigments include, but are not limited to, titanium dioxide, barytes, clay, calcium carbonate, CI Pigment White 6 (titanium dioxide), CI Pigment Red 101 (red iron oxide), CI Pigment Yellow 42, CI Pigment Blue 15, 15:1, 15:2, 15:3, 15:4 (copper phthalocyanines); CI Pigment Red 49:1, and CI Pigment Red 57:1. Preferably, the pigment is titanium oxide. Colorants such as, for example, phthalocyanine blue, molybdate orange, or carbon black may be also added to the ambient cure oxidative cure enamel composition.

An acrylate-functionalized alkyd coating composition, preferably an acrylate-functionalized alkyd coating enamel composition, may be coated onto a substrate and cured using techniques known in the art (e.g., by spray-applying 3 to 4 mils of wet coating onto a metal panel and heating in a 150° C. forced air oven for 30 minutes). The substrate may be any common substrate, such as, for example, paper, polyester films such as polyethylene or polypropylene, metals such as aluminum or steel, glass, urethane elastomers, primed (painted) substrates, and the like. An acrylate-functionalized alkyd coating composition of the invention may also be cured at room temperature (ambient cure).

An acrylate-functionalized alkyd coating composition of the invention may further contain at least one coating additive known in the art. Examples of suitable coating additives include, but are not limited to, leveling and flow control agents such as silicones, fluorocarbons, cellulosics, extenders, plasticizers, flatting agents, pigment wetting, and dispersing agents; ultraviolet (UV) absorbers; UV light stabilizers; defoaming and antifoaming agents; anti-settling, anti-sag and bodying agents; anti-skinning agents; anti-flooding and anti-floating agents; and corrosion inhibitors. Specific examples of such additives can be found in Raw Materials Index, published by the National Paint & Coatings Association, 1500 Rhode Island Avenue, N.W., Washington, D.C. 20005, incorporated herein by reference. Further examples of such additives may be found in U.S. Pat. No. 5,371,148, which is likewise incorporated herein by reference.

Examples of flatting agents include, but are not limited to, synthetic silica, available from the Davison Chemical Division of W.R. Grace & Company as SYLOID®; polypropylene, available from Hercules Inc., as HERCOFLAT®; and synthetic silicate, available from J.M. Huber Corporation, as ZEOLEX®.

Examples of dispersing agents include, but are not limited to, sodium bis(tridecyl) sulfosuccinate, di(2-ethyl hexyl) sodium sulfosuccinate, sodium dihexylsulfosuccinate, sodium dicyclohexyl sulfosuccinate, diamyl sodium sulfosuccinate, sodium diisobutyl sulfosuccinate, disodium iso-decyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK® of Buckman Laboratories Inc.; BYK® of BYK Chemie, U.S.A.; FOAMASTER® and NOPCO® of Henkel Corp./Coating Chemicals; DREWPLUS® of the Drew Industrial Division of Ashland Chemical Company; TRYSOL® and TROYKYD® of Troy Chemical Corporation, and SAG® of Union Carbide Corporation.

Examples of U.V. absorbers and U.V. light stabilizers include, but are not limited to, substituted benzophenone, substituted benzotriazoles, hindered amines, and hindered benzoates, available from American Cyanamid Company as CYASORB UV®, and diethyl-3-acetyl-4-hydroxy-benzyl-phosphonate, 4-dodecyloxy-2-hydroxy benzophenone, and resorcinol monobenzoate.

The coating compositions of the invention may be either waterborne or solvent-borne. The waterborne compositions may contain from 0 to about 30 wt %, and preferably from 0 to about 10 wt %, based on the total weight of the composition, of an organic solvent. Preferred organic solvents are water miscible, and include, but are not limited to, ethanol, n-propanol, isopropanol, n-butanol, sec-butanol, isobutanol, ethylene glycol, monobutyl ether, propylene glycol n-butyl ether, propylene glycol methyl ether, propylene glycol monopropyl ether, dipropylene glycol methyl ether, and diethylene glycol monobutyl ether.

Examples of organic solvents typically used in the solvent-borne acrylate-functionalized alkyd coating compositions additionally include, but are not limited to, benzene, xylene, mineral spirits, vm&p naphtha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, trimethylpentanediol mono-isobutyrate, ethylene glycol mono-octyl ether, diacetone alcohol, TEXANOL® ester alcohol (Eastman Chemical Co.), and the like. These solvents may also include reactive solvents, such as, for example, diallyl phthalate, SANTOLINK XI-100® polyglycidyl allyl ether from Monsanto, and others as described in U.S. Pat. Nos. 5,349,026 and 5,371,148, which are incorporated herein by reference. Preferably, the organic solvent is xylene. An acrylate-functionalized alkyd coating composition of the invention has a high solids content of generally greater than about 70%.

The invention also provides a method of preparing an acrylate-functionalized alkyd coating composition comprising the step of combining an acrylate-functionalized alkyd resin with at least one drier in the presence of an organic solvent, each as described above. An acrylate-functionalized alkyd resin may be prepared as described above. Preferably, the acrylate-functionalized alkyd resin is reacted with at least one drier present in an amount of about 0.01–3.0 wt % in an organic solvent.

The following examples are given to illustrate the invention. It should be understood, however, that the invention is not to be limited to the specific conditions or details described in these examples.

The examples of various coating compositions of the invention use the following materials not described above:

PAMOLYN 200, a tall oil fatty acid, sold by Eastman Chemical Co. of Kingsport, Tenn.

PAMOLYN 380, a conjugated special fatty acid, sold by Eastman Chemical Co. of Kingsport, Tenn.

FASCAT 4100 and FASCAT 4350, esterification catalysts, sold by M&T Chemicals of Rahway, N.J.

Zirconium HEX-CEM, a zirconium carboxylate, sold by OMG Americas of Westlake, Ohio.

Cobalt TEN-CEM, a cobalt carboxylate, sold by OMG Americas of Westlake, Ohio.

Zirconium HYDRO-CEM, a zirconium carboxylate, sold by OMG Americas of Westlake, Ohio.

Cobalt HYDRO-CURE II, a cobalt carboxylate, sold by OMG Americas of Westlake, Ohio.

Silwet L-77, a polyalkyleneoxide-modified heptamethyltrisiloxane, sold by OSI Specialities of Danbury, Conn.

SCS 4682, SCS 4683, SCS 4712, and Atlas G-3300B, non-migratory surfactants, sold by Uniqema of New Castle, Del.

The following methods were used to evaluate the coatings and films prepared according to the invention:

Tack-Free Cotton Test: The coating is considered tack-free if it does not pull fibers when the film surface is in contact with absorbent cotton fibers.

Through-Dry Thumb Test: The coating is considered through-dry if it is not affected (no wrinkling) by pressing and twisting with the thumb on the surface of the film.

EXAMPLES

Example 1

Preparation of Alkyd Resin 1

To a three-neck, round-bottom flask equipped with a mechanical stirrer, a steam-jacketed partial condenser, a Dean-Stark trap, a nitrogen inlet, and a water condenser, were charged pentaerythritol (PE) (425 g), trimethylolpropane (TMP) (174 g), soybean oil (2351 g), and FASCAT 4350 (0.39 g). The mixture was allowed to react at 238° C. for five hours in this alcoholysis step. To the mixture were then added isophthalic acid (IPA) (950 g) and the refluxing solvent, methyl isobutyl ketone (MIBK) (97.5 g). The reaction was allowed to continue at 238° C. until 203 mL of the condensate (water) was obtained. The acid number was determined to be 8.6 mg KOH/g. The resulting resin was allowed to cool and was then isolated. It had a number average molecular weight (Mn) of 2,500, and a weight average molecular weight (Mw) of 200,000.

Example 2

Preparation of Acrylate-Functionalized Alkyd Resin 1

To a three-neck, round-bottom flask equipped with a mechanical stirrer, a water condenser, and a nitrogen inlet, were charged the alkyd resin 1 of Example 1 (260 g) and glycidyl methacrylate (GMA) (6.58 g, 0.046 mol). The reaction mixture was stirred at 150–160° C. for 2 hr and the acid number determined to be 2.6 mg KOH/g. The mixture was allowed to cool to 130° C. and an additional amount of GMA (1.3 g) added. The reaction was allowed to continue at 160° C. for 1.5 hr to yield a clear resin with an acid number of 1.2.

Example 3

Coating Formulations

A coating formulation was prepared by mixing the modified alkyd resin (10.0 g) prepared in Example 2 with xylene (4.29 g) and a drier blend (0.34 g). A control formulation was also prepared using the unmodified resin from Example 1. The drier blend was prepared by mixing Zirconium HEX-CEM (18%, OMG Americas) (42.1 g), Cobalt TEN-CEM (12%, OMG Americas) (12.6 g), and methyl amyl ketone (MAK) (29.8 g).

Example 4

Film Dry Time

The above coating formulations (70% solids) were drawn down on Leneta chart (3 mil wet thickness) and allowed to dry in air at room temperature. The results of the Tack-Free Cotton test and Through-Dry Thumb test are listed in the table below:

|  | Tack-Free Time (hr) | Through-Dry Time (hr) |
| --- | --- | --- |
| Unmodified Alkyd 1 | >11 and <20 | >11 and <20 |
| Acrylate Alkyd 1 | 7 | 9 |

As shown in the above table, the dry time of the alkyd was significantly improved by modifying with GMA.

Example 5

Preparation of Waterborne Alkyd Resin 2

An NPG/SIP adduct was first prepared by reacting neopentyl glycol (NPG) (827 g, 7.95 mol), 5-sodiosulfoisophthalic acid (SIP) (536 g, 2.00 mol), water (91.9 g), and the acid catalyst FASCAT 4100 (1.10 g) in a three-neck, round-bottom flask equipped with a mechanical stirrer, a steam-jacketed partial condenser, a Dean-Stark trap, a nitrogen inlet, and a water condenser. The reaction temperature was gradually increased from 110–150° C. in a 45-min period and the distillate collected in the Dean-Stark trap. The reaction was allowed to continue at 150–180° C. for 3 hr, and at 190° C. for 4.5 hr, until an acid number of 3.0 mg KOH/g was obtained. A portion of the resultant product was used in the following step.

In a separate reactor equipped with the same configuration as above were charged neopentyl glycol (NPG) (48.4 g, 0.47 mol), the above NPG/SIP adduct (148 g), pentaerythritol (PE) (42.9 g, 0.32 mol), isophthalic acid (IPA) (97.2 g, 0.59 mol), and FASCAT 4100 (0.34 g). The mixture was allowed to react at 170–190° C. until 16.0 g of the condensate (water) was obtained. After the mixture was cooled, PAMOLYN 200 (Eastman) (423 g, 1.46 mol) was then added. The reaction was allowed to continue at 170–220° C. until an acid number of 9.1 mg KOH/g was obtained. The resulting resin was allowed to cool and subsequently collected.

Example 6

Preparation of Waterborne Acrylate-Functionalized Alkyd Resin 2

To a three-neck, round-bottom flask equipped with a mechanical stirrer, a water condenser, and a nitrogen inlet, were charged the alkyd resin 2 of Example 5 (150 g) and glycidyl methacrylate (GMA) (3.80 g, 0.027 mol). The reaction mixture was stirred at 150° C. for 2.5 hr and the acid number determined to be 3.6 mg KOH/g. The mixture was allowed to cool to 130° C. and additional GMA (1.90 g) added. The reaction was allowed to continue at 150° C. for 1.5 hr to yield a resin with an acid number of 2.6.

Example 7

Waterborne Coating Formulations

A coating formulation was prepared by mixing the modified alkyd resin (10.0 g) prepared from Example 6 with water (14.6 g), a drier blend (0.34 g), and Silwet L-77 (OSI Specialties) (0.06 g). A control formulation was also prepared using the unmodified resin from Example 5. The drier blend was prepared by mixing Zirconium HYDRO-CEM (12%, OMG Americas) (26.9 g), Cobalt HYDRO-CURE II (OMG Americas) (13.1 g), and ethylene glycol monobutyl ether (EB) (10.0 g).

Example 8

Film Dry Time

The above waterborne coating formulations were drawn down on Leneta chart (3 mil wet thickness) and allowed to dry in air at room temperature. The results of the Through-Dry Thumb test are listed in the table below:

|  | Through-Dry time (hr) |
| --- | --- |
| Unmodified Alkyd 2 | >7 days |
| Acrylate Alkyd 2 | 20 hr* |

*Film surface remained slightly tacky

Example 9

Emulsification of Acrylate-Functionalized Alkyd Resin

An acrylate-functionalized alkyd resin as prepared in Example 2 (500 g) was placed in a two-quart stainless steel beaker, followed by the Uniqema surfactants SCS 4682 (3.3 g), SCS 4683 (24.4 g), SCS 4712 (3.3 g), and Atlas G-3300B. The mixture was brought to 50° C. under gentle agitation with a 2" Cowles blade. Once the proper temperature was reached, the addition of water (441 g), heated to 60° C., was started via an FMI pump. As the addition of water proceeded, the speed of the Cowles blade was gradually increased to 2000 rpm. Once the inversion of the emulsion was confirmed, the speed of the blade was reduced, and the remaining water was added to the emulsion.

It should be understood that the foregoing discussion and examples merely present a detailed description of certain preferred embodiments. It will be apparent to those of ordinary skill in the art that various modifications and equivalents can be made without departing from the spirit and scope of the invention. All the patents, journal articles and other documents discussed or cited above are herein incorporated by reference.

We claim:

1. An acrylate-functionalized alkyd resin, comprising the reaction product of:
    (a) from about 95 to about 99 wt % of an alkyd resin having an acid number from greater than 0 to about 10 mg KOH/g; and
    (b) from about 1 to about 5 wt % of a glycidyl acrylate, wherein the reaction product contains reactive acrylate moieties, and
    wherein the weight percents are based on the total weight of (a) and (b).

2. The acrylate-functionalized alkyd resin of claim 1, wherein the alkyd resin is not reacted with an acid or an acid anhydride prior to reacting with the glycidyl acrylate.

3. The acrylate-functionalized alkyd resin of claim 1, wherein the acid number of the alkyd resin is from about 2 to about 9 mg KOH/g.

4. The acrylate-functionalized alkyd resin of claim 1, wherein the acid number of the alkyd resin is from about 3 to about 9 mg KOH/g.

5. The acrylate-functionalized alkyd resin of claim 1, wherein the acid number of the alkyd resin is from about 3 to about 7 mg KOH/g.

6. The acrylate-functionalized alkyd resin of claim 1, wherein the acid number of the alkyd resin is from about 4 to about 7 mg KOH/g.

7. The acrylate-functionalized alkyd resin of claim 1, wherein the alkyd resin comprises the reaction product of:
    (i) a diol, in an amount of from 0 to about 30 mol %;
    (ii) a polyol, present in an amount of from about 10 to about 40 mol %;
    (iii) a polyacid, present in an amount of from about 20 to about 40 mol %;
    (iv) a monofunctional acid, in an amount of from 0 to about 10 mol %; and
    (v) a fatty acid, a fatty ester, or a naturally occurring oil, present in an amount of from about 10 to about 50 mol %,
    wherein the mole percents are based on the total moles of (i), (ii), (iii), (iv), and (v).

8. The acrylate-functionalized alkyd resin of claim 1, wherein the glycidyl acrylate is glycidyl methacrylate.

9. The acrylate-functionalized alkyd resin of claim 1, wherein the alkyd resin further comprises from about 2 to about 10 mol % of a sulfomonomer.

10. The acrylate-functionalized alkyd resin of claim 7, wherein the diol comprises neopentyl glycol, the polyol comprises trimethylolpropane or pentaerythritol, the polyacid comprises isophthalic acid or phthalic anhydride, and the naturally occurring oil or fatty acid comprises soybean oil or tall oil fatty acid.

11. The acrylate-functionalized alkyd resin of claim 9, wherein the sulfomonomer comprises 5-sodiosulfoisophthalic acid.

12. An acrylate-functionalized alkyd coating composition, comprising:
    (I) the acrylate-functionalized alkyd resin of claim 1;
    (II) at least one drier; and
    (III) an organic solvent.

13. An acrylate-functionalized alkyd coating composition, comprising:
    (I) an acrylate-functionalized alkyd resin of claim 1;
    (II) at least one drier; and
    (III) water.

14. The acrylate-functionalized alkyd coating composition of claim 12, wherein:
the acrylate-functionalized alkyd resin is present in an amount of from about 50 to about 98 wt %, based on the total composition;
the drier is present in an amount of from about 0.01 to about 3.0 wt %, based on the total weight of the composition; and
the organic solvent is present in an amount of from about 1 to about 50 wt %, based on the total weight of the composition.

15. The acrylate-functionalized alkyd coating composition of claim 13, wherein:
the acrylate-functionalized alkyd resin is present in an amount of from about 30 to about 60 wt %, based on the total composition;
the drier is present in an amount of from about 0.01 to about 3.0 wt %, based on the total composition; and
the water is present in an amount of from about 40 to about 70 wt %, based on the total composition.

16. The acrylate-functionalized alkyd coating composition of claim 13, further comprising from greater than 0 to about 30 wt %, based on the total composition, of an organic solvent.

17. The acrylate-functionalized alkyd coating composition of claim 13, further comprising an amine.

18. The acrylate-functionalized alkyd coating composition of claim 13, further comprising a surfactant.

19. The acrylate-functionalized alkyd coating composition of claim 12, further comprising at least one additive selected from the group consisting of a flow control agent, an extender, a plasticizer, a flatting agent, a pigment wetting agent, a pigment dispersing agent, an ultraviolet (UV) absorber, an UV light stabilizer, a tinting pigment, a colorant, a defoaming agent, an antifoaming agent, an anti-settling agent, an anti-sag agent, a bodying agent, an anti-skinning agent, an anti-flooding agent, an anti-floating agent, and a corrosion inhibitor.

20. The acrylate-functionalized alkyd coating composition of claim 13, further comprising at least one additive selected from the group consisting of a flow control agent, an extender, a plasticizer, a flatting agent, a pigment wetting agent, a pigment dispersing agent, an ultraviolet (UV) absorber, an UV light stabilizer, a tinting pigment, a colorant, a defoaming agent, an antifoaming agent, an anti-settling agent, an anti-sag agent, a bodying agent, an anti-skinning agent, an anti-flooding agent, an anti-floating agent, and a corrosion inhibitor.

21. A method of making an acrylate-functionalized alkyd coating composition, comprising the steps of combining:
(I) the acrylate-functionalized alkyd resin of claim 1;
(II) at least one drier; and
(III) an organic solvent.

22. A method of making an acrylate-functionalized alkyd coating composition, comprising the steps of combining
(I) the acrylate-functionalized alkyd resin of claim 1;
(II) at least one drier; and
(III) water.

23. The method of claim 21, wherein:
the acrylate-functionalized alkyd resin is present in an amount of from about 50 to about 98 wt %, based on the total weight of the composition;
the drier is present in an amount of from about 0.01 to about 3.0 wt %, based on the total weight of the composition; and
the organic solvent is present in an amount of from about 1 to about 50 wt %, based on the total composition.

24. The method of claim 22, wherein:
the acrylate-functionalized alkyd resin is present in an amount of from about 30 to about 60 wt %, based on the total weight of the composition;
the drier is present in an amount of from about 0.01 to about 3.0 wt %, based on the total weight of the composition; and
the water is present in an amount of from about 40 to about 70 wt %, based on the total weight of the composition.

25. The method of claim 22, further comprising the step of combining a surfactant.

26. A substrate coated with the acrylate-functionalized alkyd coating composition of claim 12.

27. A substrate coated with the acrylate-functionalized alkyd coating composition of claim 13.

28. A method of making an emulsion of the acrylate-functionalized alkyd resin of claim 1, comprising a step of combining the acrylate-functionalized alkyd resin of claim 1 with at least one surfactant in the presence of water.

* * * * *